(12) United States Patent
Cohen et al.

(10) Patent No.: US 7,017,144 B2
(45) Date of Patent: *Mar. 21, 2006

(54) COMBINED IMAGE VIEWS AND METHOD OF CREATING IMAGES

(75) Inventors: Jason Cohen, Seatac, WA (US); Ryan Burkhardt, Redmond, WA (US); Bruce L. Green, Sammamish, WA (US)

(73) Assignee: Microsoft Corporation, Redmond, CA (US)

(*) Notice: Subject to any disclaimer, the term of this patent is extended or adjusted under 35 U.S.C. 154(b) by 775 days.

This patent is subject to a terminal disclaimer.

(21) Appl. No.: 10/173,297

(22) Filed: Jun. 17, 2002

(65) Prior Publication Data

US 2003/0233363 A1 Dec. 18, 2003

(51) Int. Cl.
*G06F 9/44* (2006.01)

(52) U.S. Cl. ............ 717/100; 717/109; 717/113; 707/104.1; 707/100; 715/515

(58) Field of Classification Search ............ 717/100, 717/109, 106, 108, 113; 715/719, 515, 513; 382/243, 304; 386/52; 707/100, 104.1; 719/313, 315

See application file for complete search history.

(56) References Cited

U.S. PATENT DOCUMENTS

| | | | |
|---|---|---|---|
| 5,142,680 A | 8/1992 | Ottman et al. | |
| 5,155,594 A * | 10/1992 | Bernstein et al. | 375/240.14 |
| 5,267,330 A * | 11/1993 | Masuda | 358/2.1 |
| 5,467,441 A * | 11/1995 | Stone et al. | 345/619 |
| 5,469,573 A | 11/1995 | McGill, III et al. | |
| 5,555,416 A | 9/1996 | Owens et al. | |
| 5,574,906 A | 11/1996 | Morris | |
| 5,634,052 A | 5/1997 | Morris | |
| 5,694,201 A * | 12/1997 | Hayashi et al. | 396/109 |
| 5,713,024 A | 1/1998 | Halladay | |
| 5,732,265 A | 3/1998 | Dewitt et al. | |
| 5,794,052 A | 8/1998 | Harding | |
| 5,813,008 A | 9/1998 | Benson et al. | |
| 5,813,017 A | 9/1998 | Morris | |
| 5,933,842 A | 8/1999 | Ross | |
| 5,983,239 A | 11/1999 | Cannon | |
| 6,016,400 A | 1/2000 | Day et al. | |
| 6,021,415 A | 2/2000 | Cannon et al. | |
| 6,080,207 A | 6/2000 | Kroening et al. | |
| 6,138,179 A | 10/2000 | Chrabaszcz et al. | |
| 6,167,562 A * | 12/2000 | Kaneko | 717/109 |
| 6,188,779 B1 | 2/2001 | Baum | |
| 6,247,128 B1 | 6/2001 | Fisher et al. | |
| 6,262,726 B1 | 7/2001 | Stedman et al. | |
| 6,282,711 B1 | 8/2001 | Halpern et al. | |

(Continued)

OTHER PUBLICATIONS

TITLE: An Object-Oriented Model of Software Configuration Management, author: Render et al, ACM, 1991.*

(Continued)

*Primary Examiner*—Ohameli C. Das
(74) *Attorney, Agent, or Firm*—Senniger Powers

(57) ABSTRACT

A first image of a first software which can be combined with other images of other software such that any one or more of the images can be restored from the combined image, and methods relating thereto. The method of making the combined image comprises creating a first image from a first software, creating a second image from the second software, and combining the first image and the second image into the combined image. Each image includes first descriptive data (metadata) corresponding to descriptive data of its software and includes file data corresponding to file data of its software.

13 Claims, 8 Drawing Sheets

U.S. PATENT DOCUMENTS

| | | | |
|---|---|---|---|
| 6,343,265 B1 | 1/2002 | Glebov et al. | |
| 6,377,958 B1 | 4/2002 | Orcutt | |
| 6,385,766 B1 | 5/2002 | Doran, Jr. et al. | |
| 6,453,413 B1 | 9/2002 | Chen et al. | |
| 6,512,526 B1 | 1/2003 | McGlothlin et al. | |
| 6,532,474 B1 | 3/2003 | Iwamoto et al. | |
| 6,598,223 B1 | 7/2003 | Vrhel, Jr. et al. | |
| 6,681,323 B1 | 1/2004 | Fontanesi et al. | |
| 6,701,513 B1* | 3/2004 | Bailey | 717/109 |
| 6,711,624 B1 | 3/2004 | Narurkar et al. | |
| 6,721,002 B1* | 4/2004 | Dotsubo et al. | 348/239 |
| 6,751,357 B1* | 6/2004 | Boon | 382/243 |
| 6,763,150 B1* | 7/2004 | MacDonald | 382/304 |
| 6,763,515 B1* | 7/2004 | Vazquez et al. | 717/109 |
| 6,782,402 B1* | 8/2004 | Hidaka et al. | 707/203 |
| 6,868,539 B1* | 3/2005 | Travison et al. | 717/100 |
| 6,877,154 B1* | 4/2005 | Nagashima et al. | 717/100 |
| 6,938,211 B1* | 8/2005 | Chang et al. | 715/733 |
| 6,944,865 B1* | 9/2005 | Zurawski | 719/313 |
| 6,947,659 B1* | 9/2005 | Nishi et al. | 386/95 |
| 2002/0174329 A1 | 11/2002 | Bowler et al. | |
| 2002/0188941 A1 | 12/2002 | Cicciarelli et al. | |
| 2002/0194398 A1 | 12/2002 | Bentley et al. | |
| 2003/0233379 A1 | 12/2003 | Cohen et al. | |
| 2004/0070678 A1 | 4/2004 | Toyama et al. | |
| 2004/0218902 A1* | 11/2004 | Yanagita | 386/52 |

OTHER PUBLICATIONS

TITLE: Image Retrieval agent: integrating image content and text, author: Favelu et al, Oct., 1999.*

Zhang et al., "A Modeling Perspective of Image-Based Installation," Dell White Paper, pp. 1-13, Mar., 2002, U.S.A.

White Paper, "Microsoft Windows 2000 Server—Remote Operating System Installation," Microsoft Corporation, pp.: i-iv, 1-41, 1999, U.S.A.

* cited by examiner

COMBINED IMAGE VIEWS AND METHOD OF CREATING IMAGES

TECHNICAL FIELD

The present invention relates to the field of disk imaging. In particular, this invention relates to a system and method for collapsing multiple individual images into a single combined image from which each of the individual images may be re-created.

BACKGROUND OF THE INVENTION

Individual software images each include a large amount of data. In general, software images are increasing in size and take up increasingly large amounts of persistent and/or non-persistent storage space for a given computer. Historically, this size has grown at an exponential rate. For example, in certain cases there is a need to capture a copy of an installed operating system, applications, utilities, or other data (sometimes referred to as "capturing a volume"). One purpose of the captured copy is for creating an image including data that can be reused at a later date, such as by being redistributed to other computers. Frequently, there is a tremendous amount of space taken up by the captured copy and its data. Usually, multiple images are copied onto a single computer-readable media. These multiple images on the same media differ typically in only certain respects, e.g., based on the language of the installed OS, which applications (and versions of those applications) are included on that image, etc. Some multiple images are merely different SKUs or editions of the same program. The result is that the majority of the data in those multiple images is common, creating a large amount of redundant space across images on the same media, which space could be used for other information.

For these reasons, a system and method for reducing the amount of redundant space is desired to address one or more of these and other disadvantages.

SUMMARY OF THE INVENTION

The invention includes, in one aspect, a software image combining method that collapses multiple individual software programs (images) into a single operational, combined image file from which each of the individual programs can be recreated. In another aspect, the invention provides a solution to the problems in the prior art by creating a single operational, combined image from multiple individual images by (1) separating the descriptive data (e.g., metadata) describing the files within each individual image from the actual data of the files themselves, and (2) separating data within each individual image that is common across multiple images. Each of the descriptive data of each individual image is included in the combined image whereas only a single copy of the common data is included in the combined image. This reduces the size of the combined image because the common data is not duplicated. The new combined image contains descriptive data (metadata) distinguishing each image within a single image file as well as a store of bits distinguishing common files and files unique to each image.

One implementation of the invention is to minimize the storage requirements of individual, different applications that run on a common operating system version. According to the invention, these individual, different applications can be combined or collapsed into a single, combined image. The combined image permits the mounting, modifying, updating, or restoring the image view of each of the individual, different applications as if each was individually, separately stored. The software functionality of the invention allows multiple single file images to be combined into one image file to take advantage of single instance storage of the common files.

In one form, the invention comprises a computer-readable medium having stored thereon a first image of a data structure of a first software. The first image can be combined with one or more other images having the same data structure into a combined image so that the first image and/or any of the one or more other images of the combined image can each be re-created by imaging from the combined image. The first image comprises an image of descriptive data of the first software and an image of file data of the first software.

In another form, the invention comprises a method of converting a first software into a first image having a data structure which can be combined with one or more other images having the same data structure to form a combined image from which the first image and/or any one or more of the other images of the combined image can each be re-created by imaging from the combined image. Metadata of the first image and a hash list of the first image are generated. Each file data of the first software is read. A hash for each file data of the first software is generated. Each file data is added to the first image and the metadata and the hash list of the first image are updated if the hash for each file data is not in the hash list.

In another form, the invention comprises a combined image including a first image of a first software and including a second image of a second software. The combined image comprises a header of the combined image; a first metadata of the first image; a second metadata of the second image; a first file data of file data of the first image and not of the second image; a second file data of file data of the second image and not of the first image; a common file data of file data of both the first image and the second image; and a signature of the combined image whereby the first image and/or the second image can be imaged from said combined image and whereby the size of the combined image is less than the total size of the first image and the second image.

In another form, the invention comprises a method comprising creating a first image from a first software, creating a second image from a second software, combining the first image and the second image into a combined image. The first image includes first descriptive data corresponding to descriptive data of the first software and includes first file data corresponding to file data of the first software. The second image includes second descriptive data corresponding to descriptive data of the second software and includes second file data corresponding to file data of the second software.

In another form, the invention comprises a method of combining a first image including a first software and a second image including a second software, wherein the first and second images include common file data, into a single combined image from which the first image and the second image can each be re-created by imaging. The common file data is identified in both the first image and the second image. The first image is separated into a first header, a first metadata, a first file data, the common file data and a first signature. The second image is separated into a second header, a second metadata, a second file data, the common file data and a second signature. The first metadata, the second metadata, the first file data, the second file data, and the common file data are combined into a single image which comprises the single combined image having a header and a signature.

In another form, the invention comprises a method of combining a first software and a second software into a single combined image from which a first image of the first software and a second image of the second software can each be re-created by imaging. The first software is converted into a base image having metadata pointing to file data. A combined digest of identifiers of all files identified by the metadata of the base image is generated. The second software is converted into a second image having metadata pointing to file data. A first file of the second image is read. An identifier of the read first file of the second image is generated. The first file is added to the files of the base image and the combined digest and the metadata of the base image are updated if the identifier of the read first file of the second image is not in the combined digest. For each of the remaining files of the second image: a next file of the second image is read; an identifier of the next read file of the second image is generated; and the next read file is added to the files of the combined image and the combined digest and the metadata of the base image are updated if the identifier of next read file of the second image is not in the combined digest.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
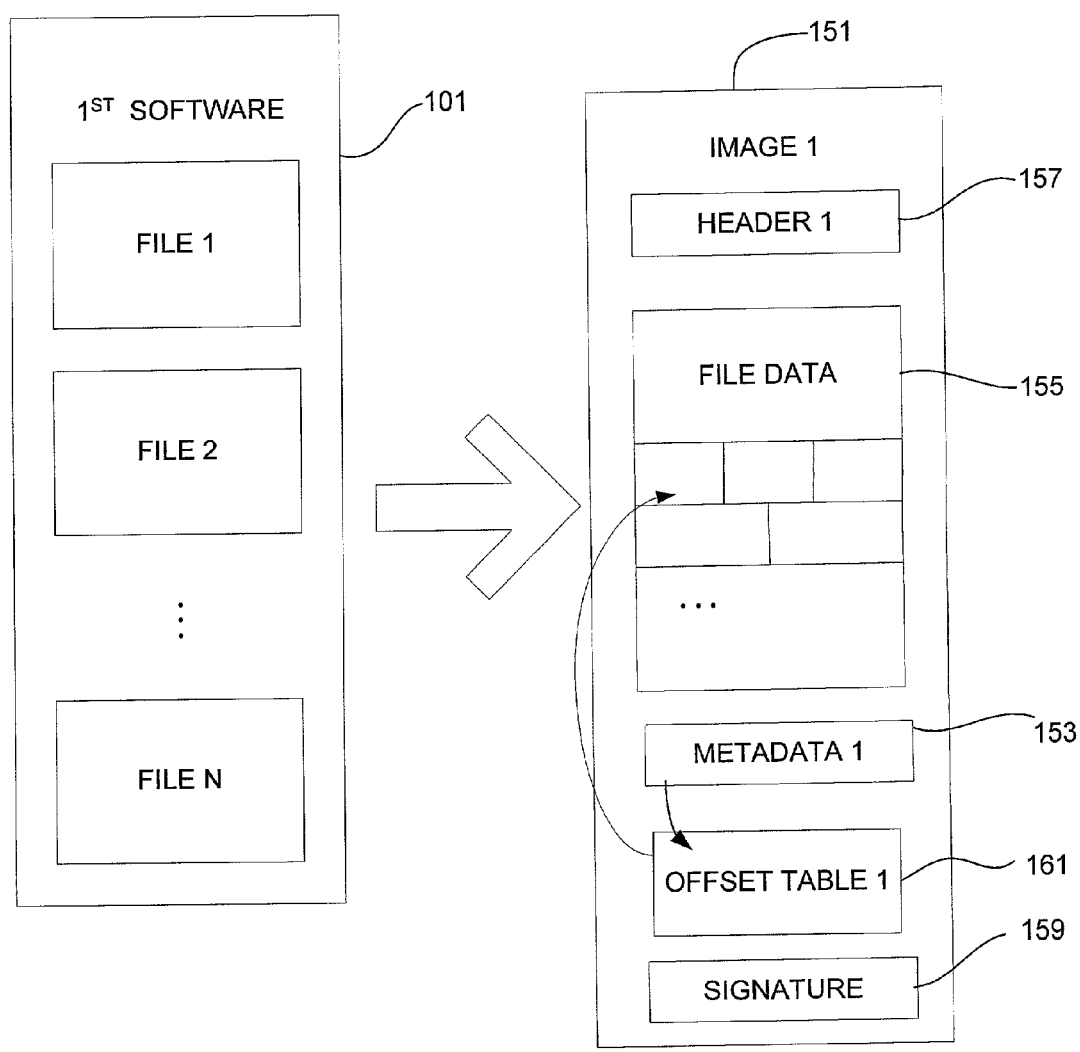
FIG. 1 is an exemplary diagram illustrating the conversion of a first software to a first image according to the invention.

Referring first to FIG. 1, in order to permit combining of various related and/or unrelated software items (herein referred to as programs), each individual software program 101 is converted into an image 151 including an image of descriptive data of the first software 101 and an image of the file data of the first software 101. "Images" and "imaging" as used herein is also referred to as "disk images," "disk imaging," "volume images" and/or "volume imaging."

The descriptive data of the first software 101 includes information representing the layout of the image 151 and is referred to as metadata 153. Essentially, metadata is all information needed for a file or file system such as a file directory to represent the file. The metadata may include any one or more of the following: file names (short or long), attributes, file times (e.g., create/access/modify), compression formats, locations (e.g., directories), directory structures, security information (e.g., access control list (ACL)) and/or stream names. By some definitions and in certain contexts, metadata may be defined to include any information which is not file data and may be viewed as including a header, an offset table and/or a signature. In this disclosure, the header, offset table and signature are separately illustrated for clarity.

The file data 155 includes any binary file data that is not metadata including but not limited to the following: the actual binary data of a particular file, stream data and/or any data of significant size. In general, the image 151 is stored on a computer-readable medium as a data structure of the software 101. As will be noted below in greater detail, one purpose of the image 151 is so that it can be combined with one or more other images having the same data structure into a combined image so that the first image 151 and/or any of the one or more other images of the combined image can be restored by imaging from the combined image. For example, the medium on which image 151 is stored may include one or more other images comprising a second image of descriptive data of a second software and a second image of file data of the second software. In some cases, at least part of the file data of the first image 151 is the same as at least part of the file data of the second image so that the image 151 may be combined with the other images, as will be discussed in greater detail below. Image 151 also includes a header 156 identifying the image 151 and a signature 159 corresponding to the image 151.

In addition, the image 151 includes an offset table 161 including the following information for each file: a unique identification, location, size, any flags relating to the file and an optional hash of the file, as described below. As illustrated in FIG. 1, the metadata 153 points to the offset table 161 and the offset table 161 points to the file data 155. In particular, the metadata 153 has the unique identifier that can be found in the offset table 161. The offset table 161 includes the offset of the location of the file data in the image.

As shown in FIG. 1, the metadata 153 is positioned between the file data 155 and the offset table 161, which is one preferred embodiment of the layout of the image 151 according to the invention. The remaining figures illustrate the metadata between the header and the file data for convenience. In general, it is contemplated that the various information may be located in various places within the image so that the invention is not intended to be limited to the locations illustrated.

Figure 2:
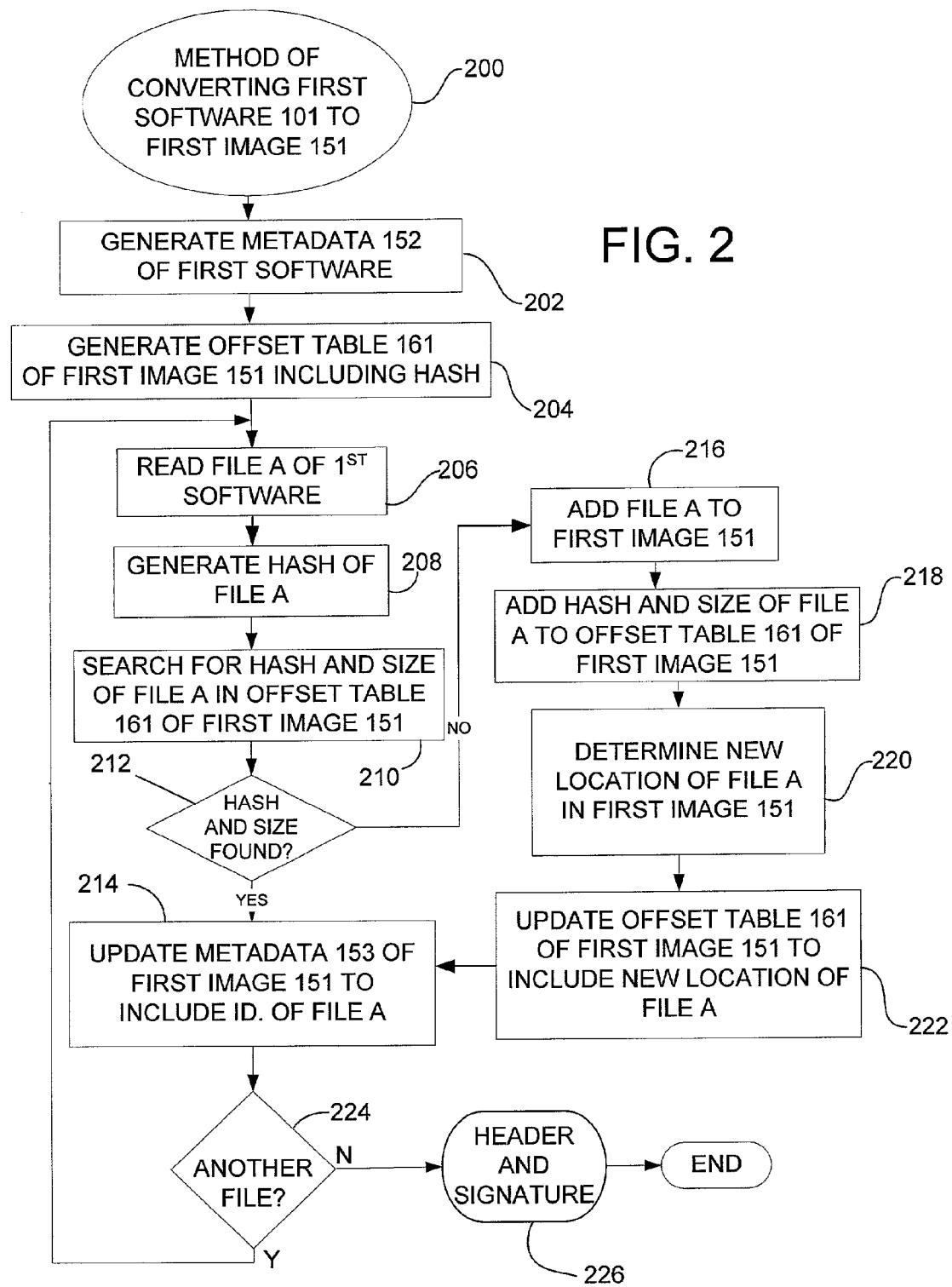
FIG. 2 is an exemplary flow chart illustrating operation of one method according to the invention for creating a first image for use as a combined image.

FIG. 2 illustrates a method of converting the first software 101 into the first image 151 having a data structure which can be combined with one or more other images having the same data structure to form a combined image to which the first image 151 and/or any one or more of the other images of the combined image can be recreated by imaging from the combined image. The method 200 of converting begins with generating metadata 152 of the first software at 202. Next, an offset table 161 of the first image 151 including a hash for each file is generated at 204. The hash list of the offset table 161 is a list of identifiers or other short unique descriptors of each of the files which are presently in the first image 151. Initially, the hash list would be empty since no files have yet been added to the first image 151.

At 206, a first file, called file A, of the first software 101 is read and at 208 a hash of the read file A is generated. The hash of file A is an identifier of the information in the file A. At 210, a search in the offset table 161 for the hash and size of file A is conducted to determine whether or not the hash for file A (and its size) is within the offset table 161. If found at 212, this indicates that file A is already a part of image 151 and does not have to be added to the image 151. At this point at 214, the metadata 152 is updated to include the unique identification (ID.) of file A which is already in the first image 151.

If it is determined at 212 that the hash and size of file A are not in the offset table 161 of the first image, the method proceeds to 216 to add file A to the first image 151 and at 218 the hash and size of file A are added to the offset table 161 of the first image 151. Next, at 220 the new location of the file A in the first image 151 is determined and at 222 the offset table 161 of the first image 151 is updated to include the new file location of file A. The method proceeds from 222 to 214 to update the metadata 152 of the first image 151 to include the unique identification of file A. Proceeding to 224, a determination is made as to whether anymore files need to be read from the first software 101. If there is more than one file as part of the first software 101, the method returns to 206 to read the next file of the first software 101. In the general case, A equals A+1 for each iteration of file reading. In the first iteration, A equaled 1 so that file 1 of the first software 101 was read. In the second iteration, A equals 2 so the second file is read and so on until all of the N files of the first software 101 are read. After all the files are read, the method proceeds to 226 to create a header and signature for the image 151 and then ends.

The method of FIG. 2 may be performed manually or with the aid of a tool or performed automatically with a tool programmed to provide the process of FIG. 2. As noted above and as illustrated in FIG. 1, the hash of the offset table 161 is optional for several reasons. First of all, it is not necessary to employ a hash list to determine what file data is a part of the image 151. However, using hash identifiers in a hash list simplifies and speeds up the process of determining whether or not an additional file needs to be copied to an image. Second, the hash list need not be a part of the image 151 and could be a temporary list used only during the process of converting the first software 101 into the first image 151. However, there are some advantages to maintaining a hash list of each mounted image so that as additional information is added to an image, or as an image is modified or updated, an up to date hash list of the image can be checked to determine whether or not the information that is being changed is redundant with other information that is already part of the image. In general, the metadata 152 and offset table 161 for image 151 are created in memory and saved to a file which is added to image 151. If hash identifiers are to be part of the offset table 161, the hash identifiers are added to the table when it is created in memory.

Figure 3:
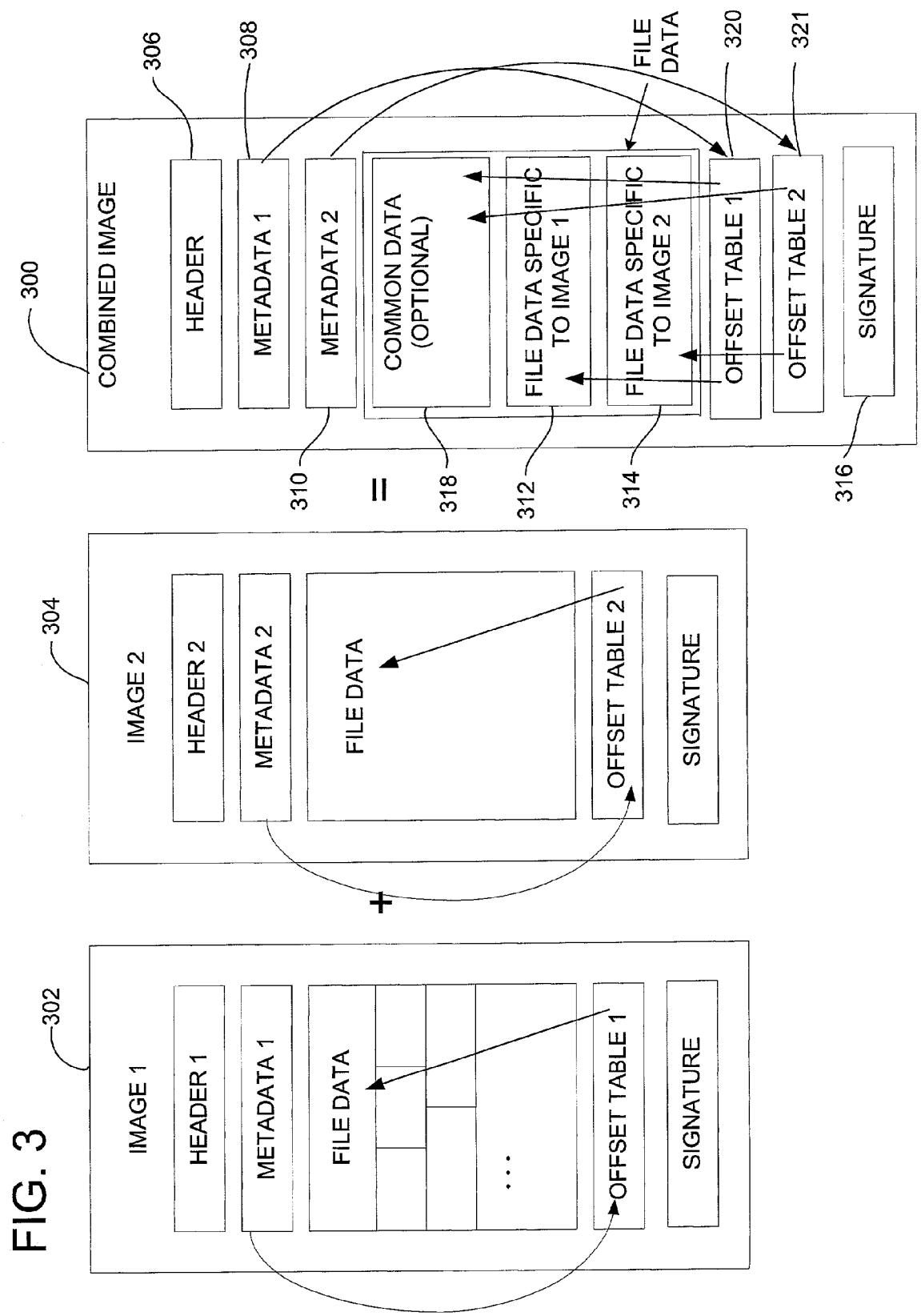
FIG. 3 is an exemplary embodiment of the invention illustrating schematically the layout of image 1 and of image 2 which may be combined into a combined image.

One reason for converting the first software into a first image is so that the first image can be combined with other images to create a combined image. For example, as shown in FIG. 3, a combined image 300 includes a first image 302 of a first software and the second image 304 of a second software. The combined image includes a header 306 of the combined image 300, a first metadata 308 corresponding to the first image 302, a second metadata 310 corresponding to the second image 304, a first file data 312 of file data of the first image 302 and not of the second image 304, a second file data 314 of file data of the second image 304 and not of the first image 302, and an offset table 320 and a signature 316 of the combined image 300. In cases where the first image 302 and the second image 304 have some of the same file data, such common data 318 is only copied once to the combined image. As a result, the size of the combined image 300 is less than the total size of the first image 302 and the second image 304. One advantage of the combined image 300 is that the first image 302 and/or the second image 304 can be restored from the combined image 300, as will be described below in greater detail with respect to FIG. 5.

As illustrated in FIG. 3, a method of creating the combined image 300 includes first creating the first image 302 from the first software, and creating the second image 304 from the second software followed by combining the first image 302 and the second image 304 into the combined image 300. As noted above and as illustrated in FIG. 3, the first image 302 includes first descriptive data (metadata 1) corresponding to descriptive data of the first software which points to the offset table (offset table 1) which points to first file data corresponding to file data of the first software. Similarly, the second image 304 includes second descriptive data (metadata 2) corresponding to descriptive data of the second software which points to the offset table (offset table 2) which points to second file data corresponding to file data of the second software. In cases where the first and second images both include at least some common file data 318, the combined image 300 includes only one copy of the common file data 318.

In a case where two images or more than two images are to be combined and it is known that the images have common file data, the following approach may be employed. Initially, the common file data of both the first and second images would be identified. The first image 302 would be separated into a first header, a first metadata, a first file data, the common file data, a first offset table and a first signature. Similarly, the second image 304 would be separated into a second header, a second metadata, a second file data, the common file data, a second offset table and a second signature. In order to create the combined image, the following would be combined: the first metadata, the second metadata, the first file data, the second file data, and the common file data into a single image which comprises the single combined image. A header, an offset table and a signature would then be added to the combined image 300. As a result, the combined image 300 includes first descriptive data (metadata 1) corresponding to descriptive data of the first software which points to the offset table (offset table 1) which points to first file data and the common file data corresponding to file data of the first software. In addition, the combined image 300 includes second descriptive data (metadata 2) corresponding to descriptive data of the second software which points to the offset table (offset table 2)

which points to second file data and the common file data corresponding to file data of the second software.

Although not illustrated in FIG. 3, it is contemplated that a list of identifiers such as a hash of each of the files may be created and used in the process of combining the first image 302 and the second image 304. Initially, a list of identifiers (e.g., a hash) of the files in the combined image 300 would be created. For each of the file data in the first image 302, a file data of the first image 302 would be read and an identifier would be associated with each read file based on the contents of the file data. For each of the file data of the second image, a file data of the second image 304 would be read and for each read file an identifier would be associated with each of the read files based on the contents of the file data. In this situation, the read file data would be combined or added to the combined image 300 when the identifier of the read file is not in the list of identifiers of the combined image 300. As a new file is added to the combined image 300, the descriptive data (metadata 1 and/or metadata 2) would be updated to include the identification of the new file data which was added to the combined image 300 and the offset table would be updated to include the new location of the new file data. The identification of each file must be unique so that it does not collide with the identification of other files. In this regard, each file identification is verified as unique and modified to be unique if it is not before the metadata is updated.

Figure 4:
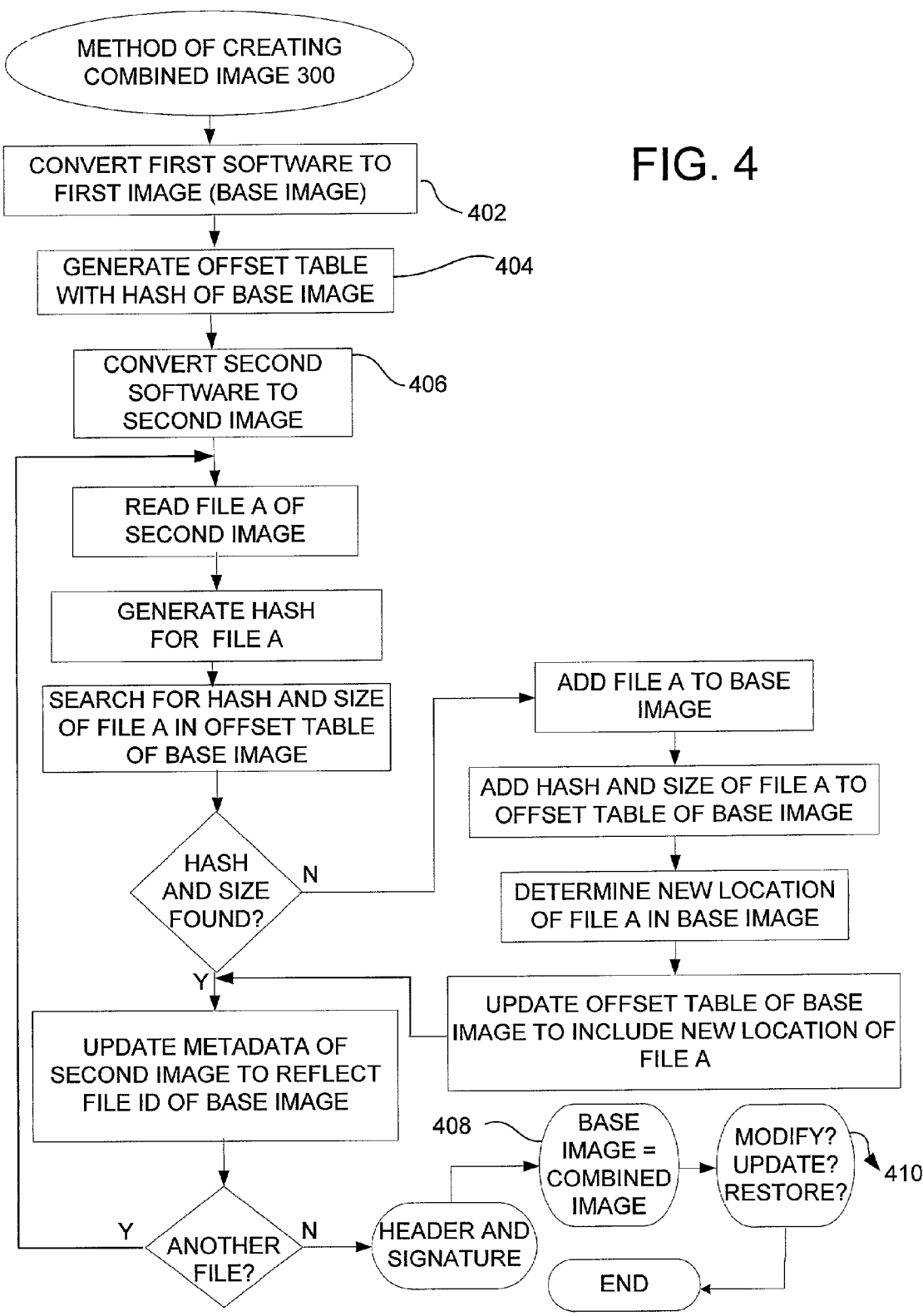
FIG. 4 is an exemplary flow chart illustrating operation of a method according to the invention for creating a combined image.

Referring to FIG. 4, a method is illustrated of combining a first software and a second software into a single combined image 300 from which a first image 302 of the first software and a second image 304 of the second software can each be recreated by imaging. Initially, the first software is converted into a base image having metadata pointing to its file data at 402. In general, the base image is the image to which files will be added and may be a pre-existing image or a newly created image For example, preexisting image 302 may be viewed as the base image to which image 304 would be added. A combined offset table including the hash list of identifiers of all the files identified by the metadata of the base image is next generated at 404. Next at 406, the second software is converted into a second image 304.

The remainder of the substantive portion of adding the second image 304 to the base image 302 of the method illustrated in FIG. 4 corresponds to the substantive portion of the method of FIG. 2. In particular, for each file the second image has read, a hash for each file is generated, and a search for the hash and size of the read file is made within the hash list of the offset table of the base image. If the hash and size of the read file are in the offset table indicating that the file data is part of the base image, the metadata of the base image is updated to include the unique identification of the file in the base image. If the hash of the read file is not in the hash list, the file is added to the base image, the hash and size of the file are added to the offset table of the base image, the new location of the file is determined and the offset table of the base image is updated to include the new location of the new file. Next, the metadata of the second image is updated to reflect the unique identification of the base image. This is done for each file of the second image 304. When all the files have been considered, a header and signature of the base image is created and the base image now becomes the combined image at 408 from which the first and second images can be recreated.

FIG. 4 also illustrates at 410 that file data of the combined image can be modified, updated or restored. In particular, first file data of the first image may be modified, updated or restored and an offset table of the first image may be modified to point to the modified, updated or restored first file data. In addition, second file data of the second image may be modified, updated or restored and an offset table of the second image may be modified to point to the modified, updated or restored second file data. Furthermore, common file data of the combined image may be modified, updated or restored and offset tables of the common image may be modified to point to the modified, updated or restored common file data. One advantage to the latter aspect is that common data need only be modified, updated or restored once for all images (e.g., the first and second images). This is in contrast to the past wherein the first and second images were separately stored and the common data would have to be updated in the first image and also updated in the second image.

Figure 5:
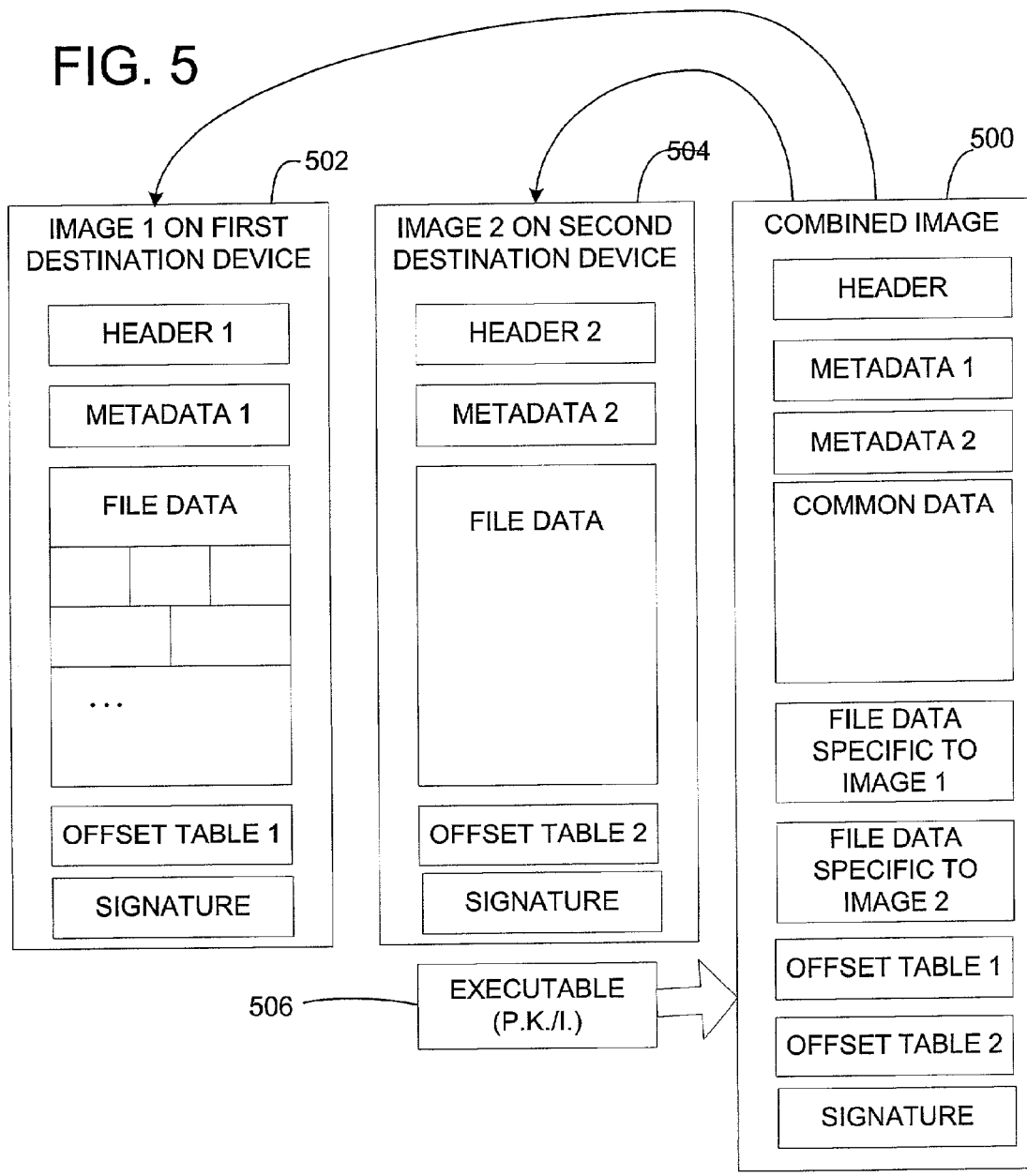
FIG. 5 is a block diagram illustrating an exemplary computer-readable medium on which the combined image may be stored so that image 1 can be restored by imaging to a separate computer-readable medium and so that image 2 can be restored by imaging to another separate computer-readable medium, according to the invention.

Referring next to FIG. 5, this diagram illustrates one advantage according to the invention of creating a combined image 500 so that a first image 502 can be restored from the combined image 500 and/or a second image 504 can be restored from the combined image 500. One example where this advantage may be applicable is a software application which has different SKUs and/or editions for use with different operating systems. To a large extent, these various editions of software have a large amount of common data. However, it has been the practice in the past to image each one of these editions separately. Thus, a vendor that was selling these various editions would be required to inventory each one of the editions separately on a separate computer-readable medium. According to one aspect of the invention, these various editions of the software may be combined into a single combined image 500 from which any one of the editions 502, 504 may be recreated. It is also contemplated that the combined image 500 may be used with an executable file 506 is part of an external set-up program or other tool for extracting an image. The file 506, when executed, extracts a particular one of the images used to create the combined image. It is further contemplated that the executable file may operate in response to a product key (P.K.) or an identifier (I.) associated with the software which is input by a user.

Figure 6:
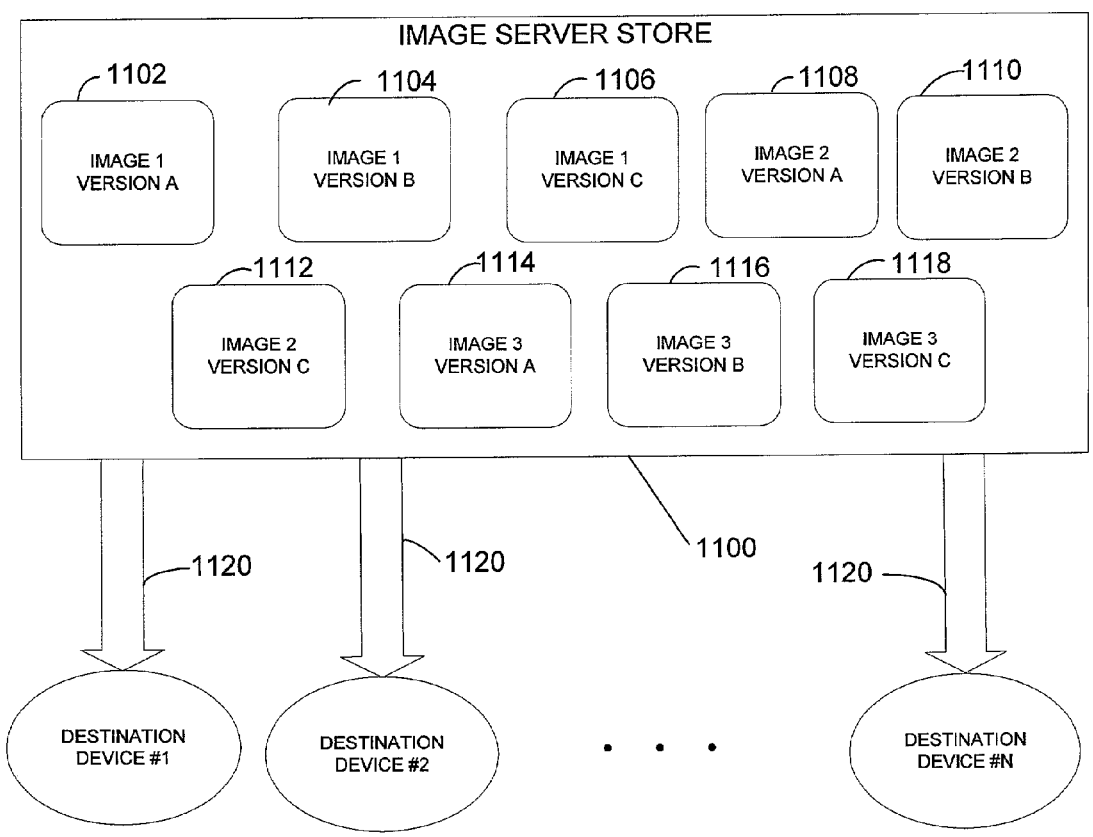
FIG. 6 is a block diagram of an image server storage system according to the prior art wherein each disk image is separately and independently stored on a computer readable medium.

One particular application of the invention relates to an image server storage system. Referring first to FIG. 6, a block diagram of an image server storage system according to the prior art is illustrated. In general, reference character 1100 refers to a image server store having a plurality of disk images 1102–1118 separately and independently stored on a computer readable medium (CRM). Many of these images may have common data. For example, images 1102–1106 correspond to versions A, B and C of the same program (image 1), respectively. As another example, images 1108–1112 correspond to versions A, B and C of another program (image 2). As another example, images 1114–1118 correspond to versions A, B and C of another program (image 3). However, each image is separately stored so that it can be copied to a destination device such as a destination device #1 through destination device #N.

The image server store 1100 is selectively linked to the plurality of destination devices #1 through #N. This linking, as indicated by arrows 1120, may be a physical interconnection such as a hardware connection or a fiber optic line. In addition or alternatively, this linking may be a wireless interconnection such as a radio frequency (RF) or infrared (IR) transmission. The purpose of this linking is to allow a selected one or more of the images 1102–1118 to be imaged from the image server store 1100 to a selected destination device. For example, if image 1102 of image 1 version A is to be loaded onto destination device #2, image 1102 would be copied to destination device #2 via link 1120. Thus, this setup allows any one or more images 1102–1118 to be selectively copied to any one or more destination devices #1 through #N via link 1120.

As noted above, one disadvantage of the prior art system illustrated in FIG. 6 is that a large amount of CRM is needed for each of the images 1102–1118. For example, if each image is 450 megabytes (MB) in size, 9×450 MB or 4050 MB of CRM would be needed to accommodate each of the nine (9) images on the server store 1100.

Figure 7:
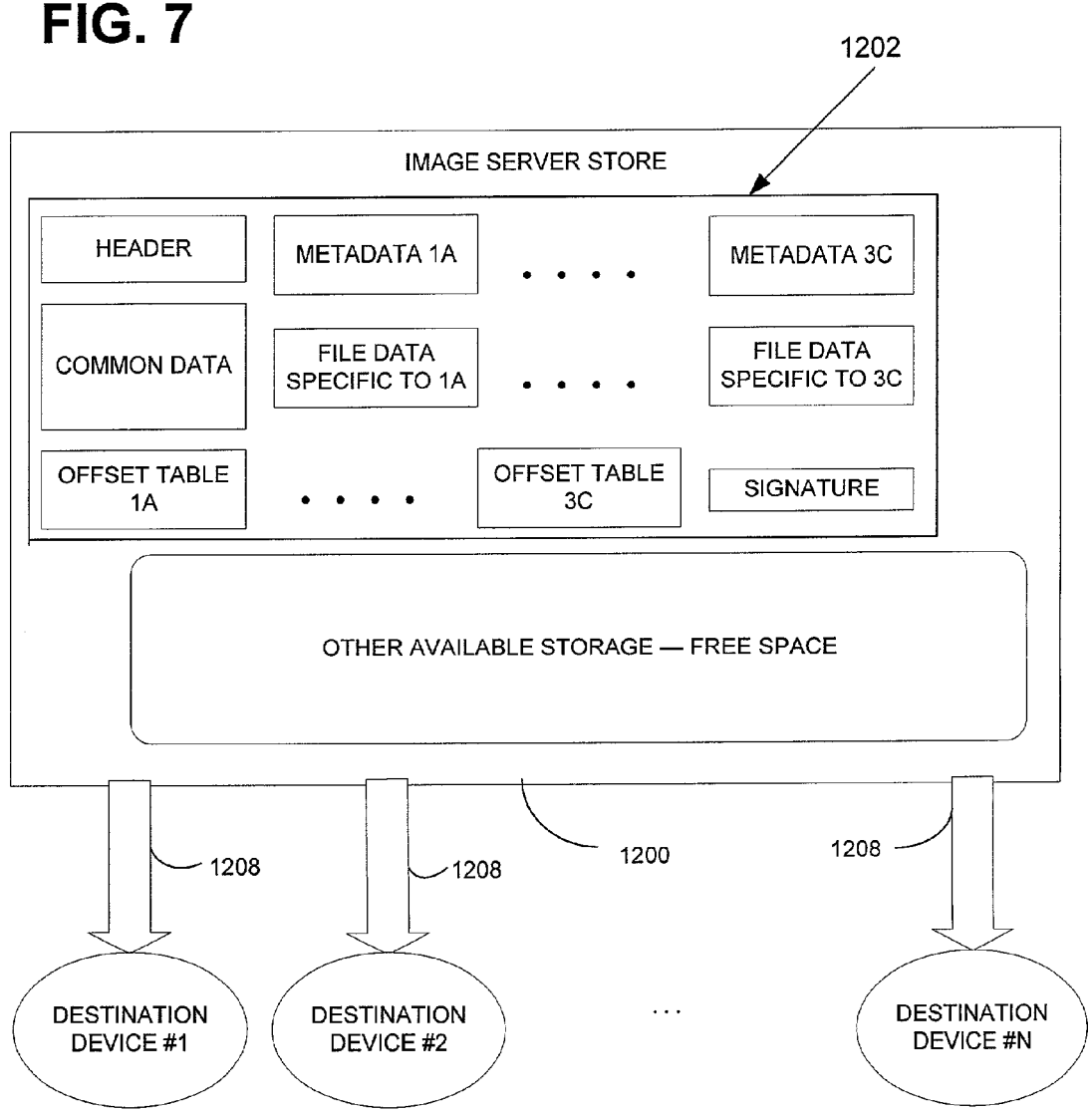
FIG. 7 is a block diagram of an image server storage system according to the invention wherein combined disk images are stored in memory.

Referring next to FIG. 7, a block diagram of an image server storage system employing combined or integrated images according to the invention is illustrated wherein combined disk images are stored on CRM. In general, reference character 1200 refers to a image server store having an integrated or combined image 1202 separately and independently stored on CRM. Each integrated image is a combination of various images which share common file data, as will be described in detail below. Common data is only copied once into the integrated image. In this example, integrated image 1202 is a combination of versions A, B and C of image 1 and versions A, B and C of image 2 and versions A, B and C of image 3, each of which may be different image editions of the same software program. File data common to versions A, B and C of images 1, 2 and 3 would only appear once within the integrated image 1202. Thus, the integrated image includes a header, metadata files for versions 1A through metadata 3C, file data files specific to versions 1A to 3C, offset tables for versions 1A through 3C, common data shared by all versions and a signature. Similarly, other integrated images, not shown, may be part of the image server store 1200.

Each integrated image 1202 is separately stored so that the image or selected portion of the image, as noted below, can be copied to a destination device. The image server store 1200 is selectively linked to a plurality of destination devices #1 through #N. This linking, as indicated by arrows 1208, may be a physical interconnection such as a hardware connection or a fiber optic line. In addition or alternatively, this linking may be a wireless interconnection such as an RF or IR transmission. The purpose of this linking is to allow a selected one or more or part of one or more of the image 1202 or other images on the server store to be imaged from the image server store 1200 to a selected destination device. For example, if image 1 version A is to be loaded onto destination device #2, the portions of image 1202 corresponding to image 1 version A (i.e., image 1102 in FIG. 6) would be copied to destination device #2 via link 1208. Thus, this setup allows any one or more or portions of one or more of the integrated image 1202 to be selectively copied to any one or more destination devices #1 through #N via link 1208.

As noted above, one advantage of the system illustrated in FIG. 7 is that a much smaller amount of disk capacity (or volume) is needed for each of the integrated image 1202 as compared to the disk capacity needed for images 1102–1118. This makes it easier to sync up with other image servers over low bandwidth connections (where as before every new image replicated, now only the data that is unique to the new image or the delta to the image needs to be replicated). For example, suppose each of the images 1102–1118 includes 350 MB of common filed data and 100 MB of unique data. As a result, the integrated image 1202, which is a combination of 9 images (images 1102–1118 of FIG. 6), would be 1250 MB (e.g., 350 MB of common data plus 9×100 MB or 900 MB of unique data from the 6 images). Thus, in the FIG. 7 system according to the invention, only 1250 MB of disk capacity is needed to accommodate the first and second combined images from which any one or more of the 9 images may be imaged to the destination devices. In contrast, as noted above, since each image is 450 MB in size, 4050 MB of disk capacity is needed to accommodate each of the 9 images on the prior art server store 1100 of FIG. 6. As a result, the image server store 1100 requires 4050 MB of disk capacity to store 9 images from which any one or more of the 9 images may be copied to a destination device whereas the image server store 1200 requires 1600 MB of disk capacity to store 2 combined images from which any one or more of the 9 images may be copied to a destination device. Thus, image server store 1200 has more available storage (e.g., 2450 MB of disk capacity) as compared to image server store 1100, both of which store information from which 9 images may be imaged to a destination device.

In one aspect of the invention of the image server store 1200 of FIG. 7, a system for manipulation by a computer (not shown) of the integrated image 1202 is contemplated. As noted above, the integrated image includes multiple software programs stored on the server store and has common files shared by the plurality of the software programs and unique files unique to a particular one of the software programs. In this system, it is contemplated that the computer and the image store are connected to a data communication system. The system would include a driver executing on the computer to provide access to the server store via the data communication system. The driver comprises one or more components for manipulating the common files and/or the unique files. Thus, a method for manipulation by a computer of the integrated image of multiple software programs stored on a server store is provided. The method comprises accessing the server store and independently manipulating the common files and/or the unique files.

Figure 8:
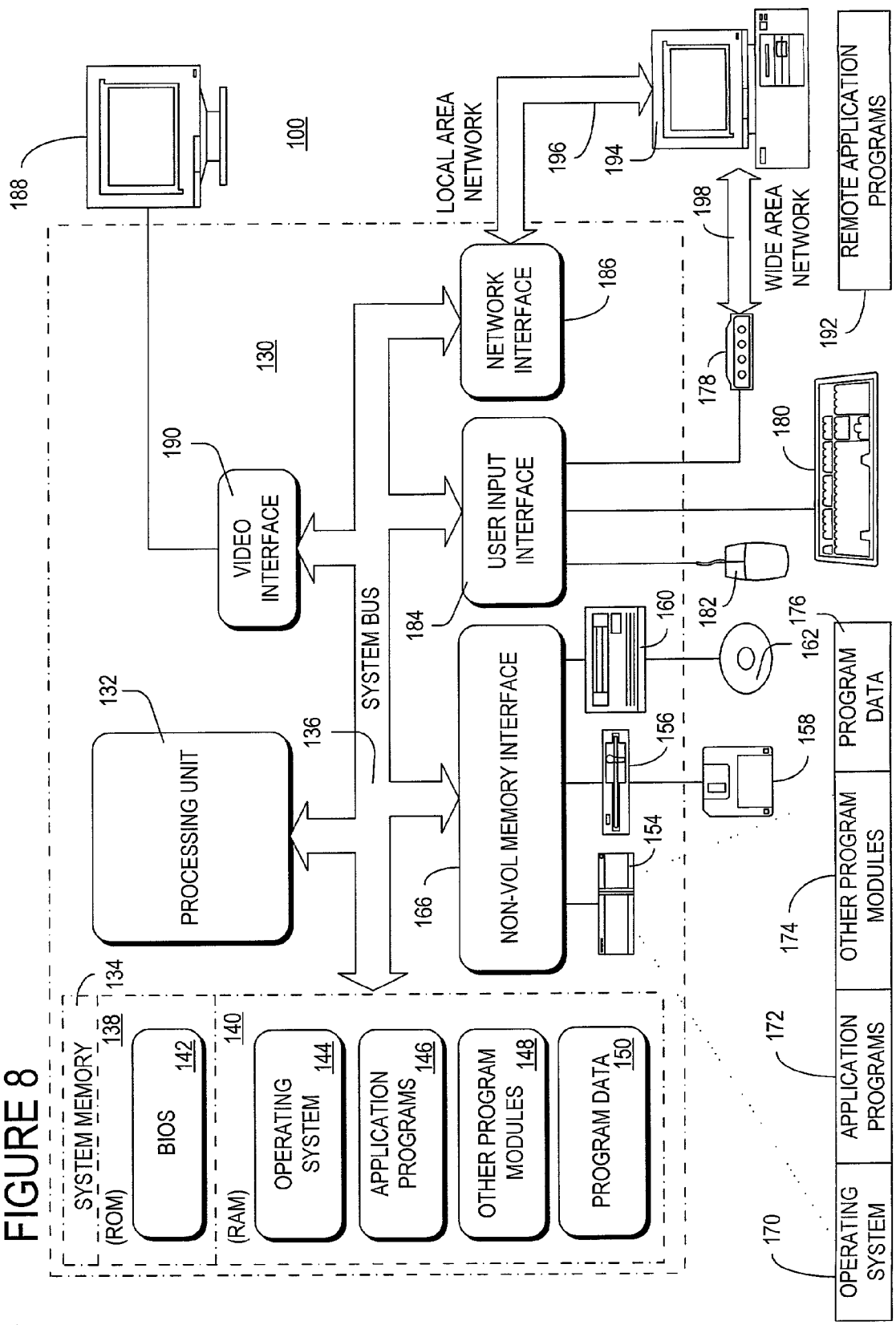
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134 on which a combined image according to the invention may stored and/or individual images recreated from a combined image may be stored. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data.

For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 151.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer-readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 151. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When use d in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as the executable file 506.

The following examples illustrate the invention. Windows brand XP Home and Windows brand XP Pro are different SKU numbers for applications with are very similar and which share a large amount of common data. The Home version is approximately 355 MB and the Pro version is approximately 375 MB. If both editions are separately copied onto a single media, about 730 MB would be required. On the other hand, imaging the two editions as a single combined image results in a single combined image of about 390 MB. Thus, the combined image saves over 300 MB of disk/media. As an example of an OEM scenario, both the Home and Pro editions may be offered with or without Microsoft Office. If the editions are separately copied, Home without Office would require 355 MB, Home with Office would require 505 MB, Pro without Office would require 375 MB and Pro with Office would require 525 MB, for a total of 1760 MB. On the other hand, imaging the four different offerings as a single combined image results in a single combined image of about 540 MB. Thus, the combined image saves over 1100 MB of disk/media.

This savings of disk/media translates into many advantages, as noted above. For example, the transmission or replication of images or a network or other link can be accomplished with less time or with reduced bandwidth.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer implemented method executing on a computer comprising:
   creating a first image from a first software, said first image including first descriptive data corresponding to descriptive data of the first software and including first file data corresponding to file data of the first software;
   creating a second image from a second software, said second image including second descriptive data corresponding to descriptive data of the second software and including second file data corresponding to file data of the second software;
   combining the first image and the second image into a combined image;
   creating a list of identifiers of the file data in the combined image;
   wherein, for each of the file data of the first image, said creating a first image comprises reading a file data of the first image, and associating each read file with an identifier based on contents of the file data;
   wherein, for each of the file data of the second image, said creating a second image comprises reading a file data of the second image, and associating each read file with an identifier based on the contents of the file data; and
   wherein said combining comprises copying the read file data to the combined image when the identifier of the read file is not in the list of the identifiers of the combined image.

2. The method of claim 1 wherein the descriptive data comprises metadata including one or more of the following: file names, attributes, file times, compression formats, locations and streams.

3. The method of claim 1 wherein the file data comprises any binary file data or any other data other than metadata.

4. The method of claim 1 further comprising modifying, updating or restoring file data and/or modifying the descriptive data to point to any modified, updated or restored file data.

5. The method of claim 1 wherein the first and second images both include at least some common file data and wherein the combined image includes only one copy of at least some of the common file data.

6. The method of claim 1 further comprising updating the descriptive data as a function of a location of the file data in the combined image.

7. A computer implemented method executing on a computer of combining a first software and a second software into a single combined image from which a first image of the first software and a second image of the second software can each be re-created by imaging, the method comprising:
   converting the first software into a base image having metadata pointing to file data;
   generating a combined digest of identifiers of all files identified by the metadata of the base image;
   converting the second software into a second image having metadata pointing to file data;
   reading a first file of the second image;
   generating an identifier of the read first file of the second image;
   adding the first file to the files of the base image and updating the combined digest and the metadata of the base image if the identifier of the read first file of the second image is not in the combined digest; and for each of the remaining files of the second image:
  reading a next file of the second image;
  generating an identifier of the next read file of the second image; and
  adding the next read file to the files of the combined image and updating the combined digest and the metadata of the base image if the identifier of next read file of the second image is not in the combined digest.

8. The method of claim 7 wherein the metadata comprises one or more of the following: file names, attributes, file times, compression formats, locations and streams.

9. The method of claim 7 wherein the file data comprises any binary file data or any other data other than metadata.

10. The method of claim 7 further comprising modifying, updating or restoring file data and/or modifying the metadata of the first image to point to any modified, updated or restored file data.

11. The method of claim 7 wherein the first software or the second software includes an operating system, an application program or both.

12. The method of claim 7 wherein the first software and the second software are similar applications, wherein the first software is for use with a first operating system and wherein the second software is for use with a second operating system.

13. The method of claim 7 wherein the first image and the second image include common file data.

* * * * *

UNITED STATES PATENT AND TRADEMARK OFFICE
CERTIFICATE OF CORRECTION

PATENT NO.         : 7,017,144 B2                                            Page 1 of 1
APPLICATION NO. : 10/173297
DATED                  : March 21, 2006
INVENTOR(S)        : Jason Cohen et al.

It is certified that error appears in the above-identified patent and that said Letters Patent is hereby corrected as shown below:

On the Title Pg, Item (54), in "Title", line 1, delete "METHOD" and insert -- METHODS --, therefor.

On the Title Pg, Item (73), in "Assignee", line 1, delete "CA" and insert -- WA --, therefor.

On the Title Pg, Item (56), in "Other Publications", line 2, delete "et al," and insert -- et al., --, therefor.

In column 1, line 1, delete "METHOD" and insert -- METHODS --, therefor.

In column 7, line 36, delete "preexisting" and insert -- pre-existing --, therefor.

In column 11, line 40, delete "160" and insert -- 161 --, therefor.

In column 11, line 49, delete "160" and insert -- 161 --, therefor.

In column 12, line 28, delete "use d" and insert -- used --, therefor.

Signed and Sealed this

Twenty-first Day of July, 2009

JOHN DOLL
*Acting Director of the United States Patent and Trademark Office*